Figure 1:
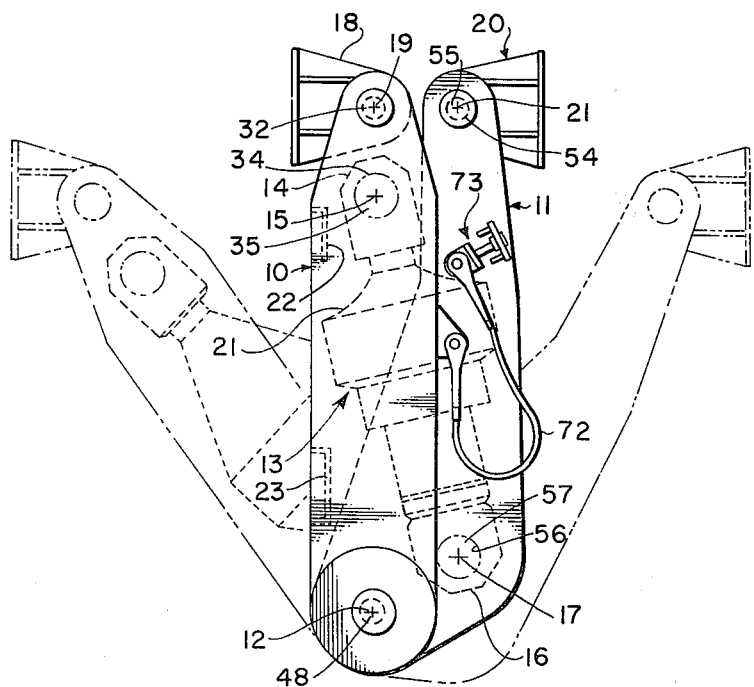

United States Patent [19]
Von Bose

[11] 3,988,013
[45] Oct. 26, 1976

[54] SHOCK ABSORBER ASSEMBLY
[75] Inventor: Robert J. Von Bose, Arlington, Tex.
[73] Assignee: Oil States Rubber Company, Arlington, Tex.
[22] Filed: Mar. 31, 1975
[21] Appl. No.: 563,825

[52] U.S. Cl. ................................ 267/116; 61/48; 114/219
[51] Int. Cl.² .......................................... F16F 9/00
[58] Field of Search ................... 267/139, 116, 140; 114/219, 230, 235 A, 235 R, 236; 61/48, 46; 293/DIG. 2, 84, 27, 66, 89; 280/481, 321, 322

[56] References Cited
UNITED STATES PATENTS
3,235,287   2/1966   Hamm ............................... 280/481
3,585,958   6/1971   Naczkowski ........................... 61/48
3,788,260   1/1974   Morini ................................ 114/219

*Primary Examiner*—James B. Marbert
*Attorney, Agent, or Firm*—Warren H. Kintzinger

[57] ABSTRACT

A shock absorbing interconnect assembly employing a hydraulic cushioning device of relatively short stroke, mounted in a scissors-like system of levers having respective length ratios which effect an amplified stroke as concerns the interconnect assembly. The ends of the hydraulic cushioning device are pivotably mounted to respective ones of a pair of arm members that, themselves, are pivoted about a common pivot axis. Stroke amplification is realized between mounting plates pivotably mounted to respective ones of the arm members at points longitudinally displaced from the common arm pivot axis. Limited motion between relatively movable members permits bonded seals at all otherwise environmentally exposed points.

11 Claims, 10 Drawing Figures

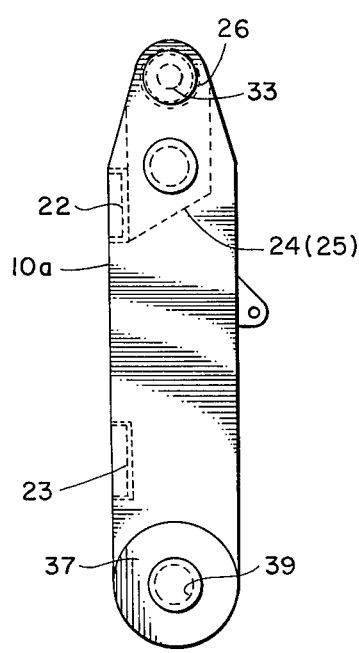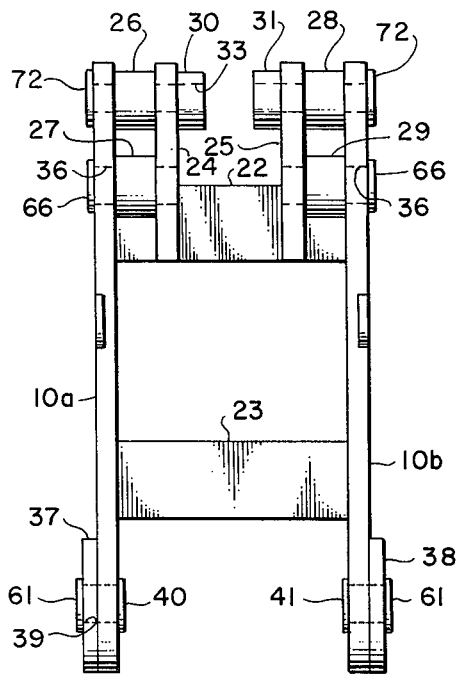
FIG. 3　　　FIG. 4
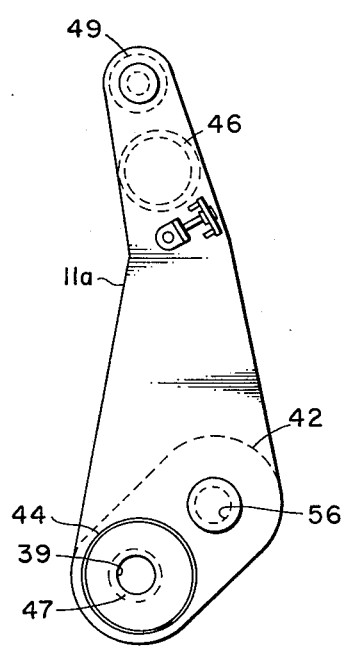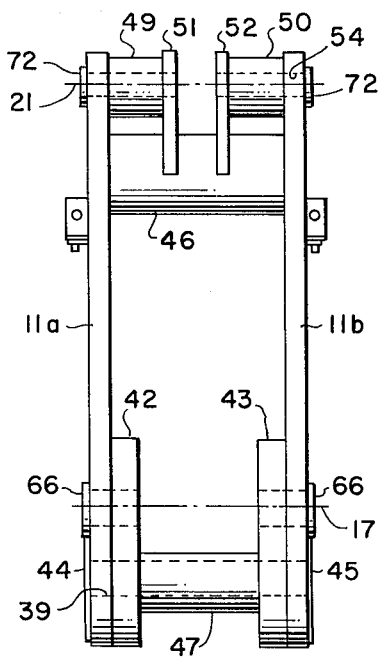
FIG. 5　　　FIG. 6

SHOCK ABSORBER ASSEMBLY

This invention relates in general to shock absorbing devices, and in particular, to an improved shock absorbing device employing a relatively short stroke hydraulic cushioning member in combination with a lever mounting means to provide a shock absorber with amplified stroke.

The invention to be described finds special usage as a dock shock absorber between a ship's dock and fender face of the dock, and will herein be described as used in that exampled environment, it being understood, however, that the invention is not limited to that usage; rather, it is useful in providing an improved shock absorbing intermount between any pair of members between which a compressive impact force is imparted.

A ship approaching a dock or berth always has some velocity at the moment of initial contact, and the ship is brought to rest by a force acting between the ship's hull and the fender face of the dock. If the dock fender face is very rigid and unyielding, the arresting force will be correspondingly high, bringing the ship to a sudden and jarring stop. The high force may result in damage to the ship, the dock, or both.

Since it is impractical, due to uncertainties in tug control, and uneconomical, due to length of time to effect docking, to reduce the ship velocity at initial dock contact below about 0.25 feet per second, there exists a need for devices to mitigate the impact forces. For this purpose, commonly used devices are rubber blocks that, by compression, shear, buckling, or combinations thereof, transform the momentum of the ship into molecular distortion forces within the rubber.

The efficiency of devices employed for reduction of docking impact forces is measured by taking a ratio of the maximum force transmitted to the dock structure, to the energy absorbed by the device. The smaller this ratio of force to energy, the more efficient the device. Known design expedients for reducing this ratio, and thereby improving efficiency, include lengthening of the active stroke of the device and making the force uniformly close to the maximum value throughout the stroke. Thus, a hydraulic cylinder with a relief valve set at a pressure corresponding to the maximum force would provide the most efficient force-travel relationship obtainable. Hydraulic cylinders, with a logarithmic distribution of port area along the cylinder, would approach the ideal under design load and velocity impact, while providing softer cushioning with smaller loads, and lower velocities.

A long stroke hydraulic cylinder, while increasing efficiency, is impractical for use as a shock absorbing device between a dock structure and dock fender, however, because the long length of the device, when compressed, would necessitate a long, over-hanging device, or, alternatively require that pockets be built into the dock to accommodate the device. Further, the length of the piston rod when the device is extended would be relatively long, and in acting as a slender column, when extended, might easily be buckled, when loaded. Thus, to directly employ a hydraulic cylinder as a shock absorbing interconnect between a dock structure and dock fender gives rise to impractical and unacceptable structure for the intended usage. A directly employed hydraulic cylinder would preclude incorporation of the very design expedients as concerns these devices by means of which the desired efficiency may be realized.

It is therefore a principal object of the present invention to provide a shock absorbing interconnect structure by means of which the efficiency of a hydraulic cushioning device may be realized without encountering physical design impracticalities that otherwise would preclude maintenance of structural integrity.

Another object is to provide a shock absorbing interconnect structure, including a hydraulic cushioning device, wherein the cushioning device may be designed to avoid piston rod buckling, while the structure, per se, realizes an amplified stroke, as compared to that of the hydraulic cushioning member.

A further object is to provide such a shock absorbing interconnect structure wherein the stroke of a hydraulic cushioning member employed therein is amplified by a system of levers having respective length ratios which result in lengthened stroke and lowered force.

A still further object is the provision of a highly efficient shock absorbing structure employing a hydraulic cylinder in a system of levers wherein a long stroke is realized with minimal angular motion between members, thus facilitating the incorportion of bonded seals at all points of relative motion between members.

Features of this invention useful in accomplishing the above objects include, in a shock absorbing interconnect assembly: a pair of elongated arm members, with first ends of each of the arm members pivotably mounted about a common axis. The other end of each of the arm members carries a pivotably-mounted mounting plate, with the respective mounting plates being attachable to respective ones of a pair of members to be relatively interconnected. A hydraulic cylinder having respective body and piston end interconnect means has one end pivotably mounted to one of the arm members to define a pivot axis therefor, which is substantially in-line with, and intermediate of, the common arm pivot axis and the mounting plate pivot axis on that arm. The other end of the hydraulic cylinder is pivotably connected to the other arm member, to define a pivot axis therefor in angularly offset relationship with respect to, and intermediate of, the common arm pivot axis and the mounting plate pivot on that arm. The arms provide a scissors-like lever structure to amplify the stroke of the hydraulic cylinder as imparted to the mounting plates on the arms.

A specific embodiment representing what is presently regarded as the best mode of carrying out the invention is illustrated in the accompanying drawing.

Figure 2:
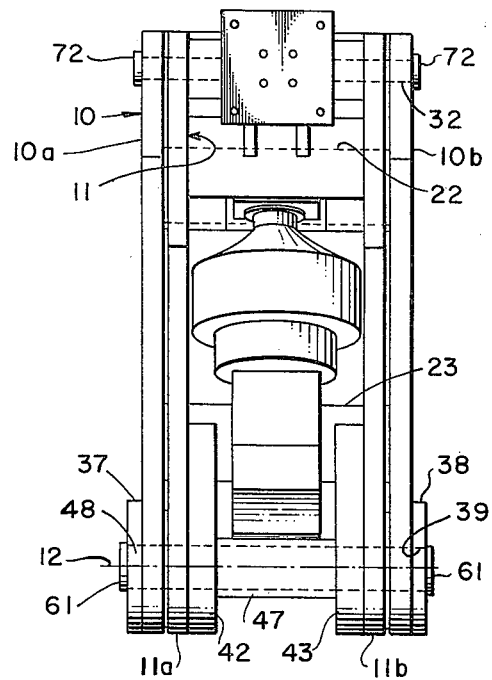
Figure 6A:
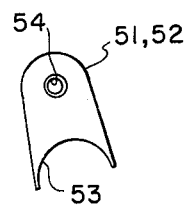
Figure 7:
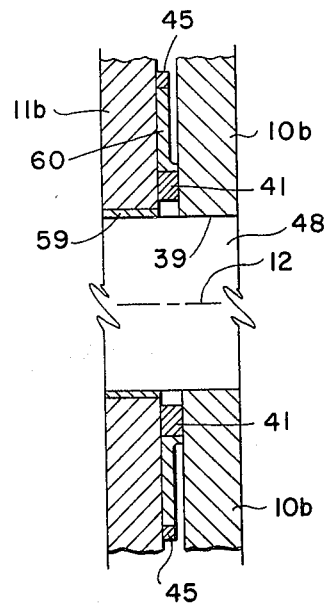
Figure 8:
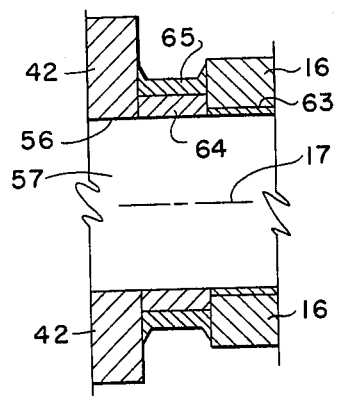
Figure 9:
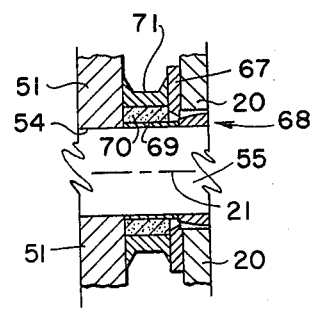

In the drawing:

FIG. 1 represents a side elevation view of the shock absorbing assembly in compressed configuration, with the extended configuration thereof represented in phantom line;

FIG. 2, a front elevation view of the assembly of FIG. 1;

FIG. 3, a side elevation view of a first pivot arm assembly;

FIG. 4, a front elevation view of the first pivot arm assembly of FIG. 3;

FIG. 5, a side elevation view of a second pivot arm assembly;

FIG. 6, a front elevation view of the second pivot assembly of FIG. 5;

FIG. 6A, a side elevation view of a mounting stiffener employed in the assembly, and, FIGS. 7, 8 and 9, partially sectioned view showing sealed bearing mount details.

Referring to the drawing:

FIGS. 1 and 2 show respective side elevation and front elevation views of the shock-absorbing assembly. FIG. 1 depicts the assembly in compressed configuration (solid lines) and in extended configuration (phantom lines).

With reference to FIG. 1, the assembly is comprised of a first elongated arm member 10, and a second elongated arm member 11, mounted for rotation about a common arm pivot axis 12. A hydraulic cushioning means 13 has one end 14 thereof pivotably mounted with respect to arm member 10 about a pivot axis 15, and the other end 16 thereof pivotably mounted with respect to arm member 11 about a pivot axis 17.

A first mounting means 18 is pivotably mounted to arm member 10 about a mounting means pivot axis 19. A second mounting means 20 is pivotably mounted to arm member 11 about a mounting means pivot axis 21. Mounting means 18 and 20 might comprise respective dock and fender mounts for the dock shock absorbing usage herein exampled.

Mounting means pivot axes 19 and 21 are located at respective end extremes of arm members 10 and 11 and the mounting means 18 and 20 might be mounted, respectively, to a dock structure and dock fender (not illustrated).

The pivot axis for the first end 14 of hydraulic cushioning device 13 is seen to be substantially in-line with the first mounting means pivot axis 19 (with respect to arm member 10) and the common arm pivot axis 12, and is displaced from the pivot axis 19 of first mounting means 18 by a distance substantially less than one-half the displacement between axis 19 and common arm pivot axis 12.

The pivot axis 17 for the second end 16 of hydraulic cushioning device 13 is angularly offset from the line between the second mounting means pivot axis 21 (with respect to arm member 11) and the common arm pivot axis 12, and is displaced from the common arm pivot axis 12 by a distance substantially less than one-half the displacement between axis 21 and the common arm pivot axis 12. In the exampled embodiment, the angular offset of the pivot axis 17 for the second end of cushioning device 13 is 42°, i.e., the angle defiend by the mounting means pivot axis 21 on arm member 11 and cushioning device pivot axis 17 with respect to common arm pivot axis 12, as vertex, is 42° greater than the angle defined by mounting means pivot axis 19 on arm member 10 and mounting means pivot axis 21 on arm member 11 (with respect to common arm pivot axis 12, as vertex).

The solid lines of FIG. 1 represent the arm members 10 and 11 in the fully compressed configuration, with hydraulic cushioning device 13 in fully compressed configuration, as would be realized with a compressive force being applied between respective mounting means 18 and 20.

The dashed-line configuration of FIG. 1 shows the assembly in a normally fully-extended configuration (as in the absence of a compressive force being applied between mounting means 18 and 20), with the hydraulic cushioning device 13 in a fully extended (elongated) configuration. It is therefore apparent, from the geometry defined in FIG. 1, that a relatively short stroke, as concerns hydraulic cushioning device 13, is amplified, via the lever arm geometry, to a relatively long stroke as concerns the respective mounting means 18 and 20. Thus the hydraulic cushioning device 13 may be constructed to take extremely high pressures, and the stroke of the cushioning device (which might comprise a hydraulic piston and cylinder assembly) forshortened to withstand the high pressure without piston rod buckling. The stroke of the hydraulic device is amplified by the system of levers having length ratios which result in lengthened stroke and lowered force.

The assembly is then basically a compact scissors-like mechanism in combination with a hydraulic cylinder, with the assembly so proportioned that ratios of mounting means stroke to hydraulic cylinder stroke of from 3:1 to 6:1 might be realized, depending on a particular design requirment.

In normal (rest) configuration, the assembly is urged into the fully extended configuration (depicted by dashed line in FIG. 1) by means of a spring restoring means 21 which might be integrally designed into the hydraulic cushioning device 13 so as to force the piston member of device 13 to a fully extended position. Force exerted so as to compress the respective mounting means 18 and 20 into the fully compressed configuration (solid lines, FIG. 1) compresses the hydraulic member spring means 21, and the loading thereby imparted causes the hydraulic means to elongate to rest position once this force is removed.

As depicted in FIG. 2, each of the aforedescribed arm members 10 and 11 may be comprised of a pair of space-paralleled, arms structurally interconnected for purposes of realizing mechanical rigidity.

The first arm member 10 might comprise space separated, paralleled plates 10a and 10b rigidly interconnected as by channel members 22 and 23, welded to respective extremes of the arms 10a and 10b as viewed in FIG. 2. (See also FIGS. 3 and 4). Arm boss members 24 and 25 are affixed, as by welding, to the respective inside faces of plates 10a and 10b by means of pipe-spacer pairs 26–27 and 28–29. Arm boss members 24 and 25 may be affixed, as by welding, the upper channel member 22 (FIG. 3). Mounting bosses 30 and 31 may be welded to the respective inside surfaces of arm boss members 24 and 25. The pivot axis 19 for the first mounting means (FIG. 1) may then be defined by a first mounting shaft 32 rotatably received in a bore 33 passing through the respective arms 10a–10b, mounting bosses 30–31, and arm bosses 24–25.

The first end 14 of hydraulic cushioning member 13 may be formed with a bore 34 through which a pivot shaft 35 is passed, with shaft 35 being received in a bore 36 passed through respective arms 10a–10b, and arm bosses 24–25 (FIG. 4).

The lower extremes of the arms 10a and 10b comprising the first arm member 10, have pivot bosses 37 and 38 affixed to the respective outer surfaces thereof. A common arm pivot axis defining bore 39 is passed through the respective arms 10a–10b and bosses 37–38. For purposes of pivot axis sealing integrity, to be further described, the arms 10a and 10b have affixed to the respective inner faces thereof, short lengths of pipe 40 and 41, positioned concentrically about the common arm pivot axis defining bore 39.

The second arm member 11, as depicted in FIGS. 2, 5, and 6, also comprises a pair of arms 11a and 11b. The lower extremes of arms 11a and 11b have pivot bosses 42 and 43 affixed to the respective inner surfaces thereof. The common arm pivot axis defining bore 39 is passed through the respective arms 11a–11b and pivot bosses 42–43, and again for purposes of sealing integrity to be further described, the arms 11a and 11b have affixed to the respective outer faces thereof, short lengths of pipe 44 and 45, positioned concentrically about the common arm pivot axis defining bore 39, and having a greater diameter than that of the short pipe length 40 and 41 on arms 10a and 10b so as to be disposed concentrically about these smaller diameter pipe lengths with the arms in the assembled relationship depicted in FIG. 2.

As best depicted in FIGS. 5 and 6, the arms 11a and 11b of arm member 11 are structurally interconnected, and held in spaced paralleled relationship, by means of cylindrical pipe members. An upper pipe member 46 is affixed, as by welding, to the respective inner surfaces of arms 11a and 11b. A lower pipe member 47 is affixed, as by welding to the respective inner surfaces of pivot bosses 42 and 43, with the inside diameter of pipe member 47 corresponding to, and being aligned with, the pivot axis defining bore 39 which is passed through arms 11a–11b and respective pivot bosses 42 and 43.

In the assembled relationship depicted in FIG. 2, a common arm pivot shaft 48 is received through the common arm pivot axis defining bore 39 in the respective arm members and associated pivot bosses and concentrically within pipe member 47, with arm members 10 and 11 being pivotable about the axis of pivot shaft 48.

The upper extremes of arms 11a and 11b, as depicted in FIG. 7, are provided with means to effect a pivot-mount of the second mounting means 20 with respect to arm member 11. Mounting bosses 49 and 50 are affixed, as by welding, to the respective inner faces of arm plates 11a and 11b. To enhance mechanical rigidity, the inner surfaces of bosses 49 and 50 are welded or otherwise affixed to respective ones of stiffener plate members 51 and 52. Plate members 51 and 52 are formed with an arcuate concave edge 53 which extends into conforming communication with the surface of pipe member 46 and may be affixed to pipe member 46 by welding (See FIG. 6A).

A mounting means pivot axis defining bore 54 is extended through arms 11a–11b, mounting bosses 49–50, and stiffener plates 51–52 and a mounting means pivot shaft 55 (FIGS. 1, 2) is received within bore 54, the axis of shaft 55 defining the second mounting means pivot axis 21.

The second end 16 of hydraulic cushioning member 13 is formed with a bore 56 (FIG. 1) through which a pivot shaft 57 is passed, with shaft 57 being received in a bore 58 passed through respective arms 11a–11b, and pivot bosses 42–43 (FIG. 6).

Each of the aforedescribed pivot relationship comprises a pivot shaft, the axis of which defines the pivot axis of a relatively pivotable pair of members.

Each of the aforedescribed pivot shafts is provided with bearing mount means at the point of relative angular motion between members. Additionally, the structures defining the pivot axes uniquely provide a nearly complete environmental protective enclosure for the pivot shafts. Further, since the angular motion at each shaft is minimum, the structure facilitates the installation of bonded seals at all otherwise environmentally exposed points of relative motion between members. Details of the bearing mounts and associated bonding sealing features are illustrated in the FIGS. 7–9.

FIG. 7 shows details of the common arm pivot structure and associated bearing and sealing means as related to the lower-right portions of FIGS. 2, 4, and 6. A portion of common arm pivot shaft 48 is shown received in bore 39 in outer arm 10b, with the axis of shaft 48 defining the common arm pivot axis 12. A sleeve bearing 59 may be press-fitted into the bore in inner arm 11b, with shaft 48 extending therethrough. The short length of pipe 41, affixed to the inner face of arm 10b is seen to extend toward the outer face of arm 11b so as to be juxtaposed therewith. The shorter length of larger diameter pipe 45 extends from the outer face of arm 11b, with the end of pipe section 45 being space-separated from arm 10b.

The structure of FIG. 7 is repeated at the other end of pivot shaft 48 (lower left portion of FIGS. 2, 4, and 6). The environmentally exposed points of rotation between members, as concerns the common arm pivot shaft, exist only at the end extremes of shaft 48 as they extend through the bore 39 in the outer arms 10a and 10b, and at the point of relative angular motion between the end extremes of the short length pipe sections 41 and the respective outer faces of inner arms 11a and 11b.

Because the assembly operates with limited angular motion between relatively rotatable arm members 10 and 11 and common arm pivot axis 12, the short pipe sections 41 and 45 provide a confine within which a sealing compound 60 may be placed to form a bonded environmental seal. The sealing compound 60 might comprise, for example, commercially available Urethane 70 Duro, which will flex to accommodate relative rotation between arms 10 and 11, while maintaining sealing integrity.

To complete the environmental seal as concerns the common arm pivot shaft 48, shaft covers 61 (FIG. 2) are placed over the otherwise exposed ends of shaft 48 and affixed, as by welding, to the respective outer faces of arms 10a and 10b.

FIG. 8 shows details of the pivot interconnect between the lower end mount 16 of hydraulic cushioning member 13 and arm member 11. A portion of pivot shaft 57 is depicted as it is passed through bore 56 in pivot boss 42 (lower left portion of FIG. 6) and is received in a sleeve bearing 63 fitted within the bore as it extends through the hydraulic member lower end mount 16. Here the end mount 16 is positioned centrally on the pivot shaft 57 by means of a pair of cylindrical spacer members. FIG. 8 shows spacer 64 that abuts the side face of pivot boss 42 and end mount 16. A similar spacer (not illustrated) would abutt the other side face of end mount 16 and pivot boss 43. Although not illustrated, the upper end mount 14 of hydraulic cushioning device 13 would likewise comprise a bearing housing for a sleeve bearing to accommodate the upper end pivot shaft 35, and would be centered on pivot shaft 35 by means of appropriately sized cylindrical spacer members.

The environmentally exposed points of relative rotation, as concerns the pivotable mounting of hydraulic cushioning member end mounts 14 and 16, then exist at the respective edges of the cylindrical spacer members on the pivot shafts 35 and 16, and at the respective ends of pivot shafts 35 and 16 as they extend through bores in associated ones of arm members 10 and 11 to the outer faces of these arm members.

Again, because the relative rotation of the cushioning device end mounts and their respective pivot shafts is limited, a sealing compound 65 may be placed over the spacer members, (such as member 64 depicted in FIG. 8) and in contact with the respective faces of the arm members 10 and 11 with which they cooperate, to form a bonded seal at these otherwise environmentally exposed points. The environmental seal, as concerns the pivot shafts for respective ends of the hydraulic cushioning devices 13, is completed by means of shaft covers 66 (FIG. 4) placed over the otherwise exposed ends of pivot shafts 35 and 57, and affixed, as by welding, to the respective outer faces of arm members 10 and 11.

FIG. 9 shows details typical of the pivot interconnect between the assembly mounting means 18 and 20 and the respective arm members 10 and 11 to which they attach. FIG. 9 is referenced to mounting means 20 and its interconnect with the inner arm member 11 (FIG. 6), it being realized that mounting means 18 would be similarly connected to outer arm member 10.

A portion of mounting means pivot shaft 55 is depicted in FIG. 9 as passing through bore 54 in stiffener plate 51 (the left-hand plate depicted in the upper portion of FIG. 6). The axis of shaft 55 comprises the pivot axis 21 for mounting means 20. A portion of mounting means 20 is depicted as it communicates with a bearing retainer 67 and bearing 68 through which pivot shaft 55 extends. The mounting means 20 bearing housing is centered on shaft 55 by means of appropriately sized spacer members, such as spacer member 69 shown in FIG. 9 between the inner face of stiffener plate 51 and mount bearing 68. A similar spacer (not illustrated) would be placed between the inner face of stiffener plate 52 (FIG. 6) and the other face of mount bearing 68. An environmental seal for the otherwise exposed points of mounting shaft 55 at the edges of the spacer members (such as spacer member 69) is provided by a foam member 70 which communicates with the surface of spacer 69 and respective faces of stiffener plate 51 and bearing retainer 67, and over which a sealing compound 71 is placed to form an environmental seal by being bonded to the respective faces of stiffener plate 51 and bearing retainer 67. Sealing compound 71 may likewise comprise Urethane 70 Duro, which flexes to accommodate relative rotation between the mounting means and the arm structure while maintaining sealing integrity.

As with the aforedescribed pivot shafts, the environmental seal for the mounting means pivot shafts may be completed by means of shaft covers 72 (FIGS. 4 and 6), placed over the otherwise exposed ends of the shafts and affixed, as by welding, to the respective outer faces of arm members 10 and 11.

The above-described bonded seals provide complete environmental protection for the mechanism. Because there are no exposed moving joints, the seals negate the worst handicap of mechanical shock mitigation devices, that of susceptibility to corrosion at bearings and on shafts.

As it might be employed as a shock-absorbing interconnect between a dock structure and a dock fender, the assembly, via respective mounting means 18 and 20, may be multiply employed to mount the fender to the dock structure. Under unloaded (quiescent) conditions, the hydraulic cushioning device is urged, via spring restoring means integrally contained therein, to an extended configuration as depicted by dashed outline in FIG. 1. A mechanically imposed limit may be included to define the quiescent spacing between the respective mounting means. For this purpose, FIG. 1 illustrates one of a pair of restraining cables 72, the ends of which may be anchored respectively to the arm members 10 and 11 to define a predetermined limit, (adjustable, as by means 73) to the angular relationship between arms 10 and 11 as urged by the spring restoring means integrated in the hydraulic cushioning member 13. The angular limit may be chosen to effect less than a full piston extension of hydraulic member 13, if desired, and additionally precludes a possibly damaging tension force, as applied between the mounting means, from being imparted to the hydraulic cushioning member.

The shock-absorbing assembly described herein offers decided advantages as employed for a dock fender shock-absorbing interconnect device. The best, most efficient rubber devices used for shock mitigation offer a ratio defining approximately 0.4 pounds reaction for 1 foot-pound of energy absorbed (400,000 pounds for one million foot-pounds). The scissors mechanism herein described, operating at a mechanical advantage of 4.5:1, has a ratio of 0.2 pounds reaction for one foot-pound of energy absorbed (200,000 pounds for one million foot pounds). Accordingly, a dock or berth structure employing the device described herein may be made much lighter (and therefore less expensive), or, alternatively, a dock designed for smaller vessels could be economically equipped to handle much larger vessels.

Whereas this invention is herein illustrated and described with respect to a particular embodiment and exampled usage thereof, it should be realized that various changes may be made without departing from essential contributions to the art made by the teachings hereof.

We claim:

1. A shock-absorbing assembly comprising: first and second elongated arm means; means pivotably mounting first ends of said first and second arm means about a common arm pivot axis; first and second mounting means pivotably mounted to respective ones of said arm means at a point longitudinally displaced from said common arm pivot axis; hydraulic cushioning means; means pivotably connecting one end of said cushioning means to a first one of said arm means to define a pivot axis therefor, substantially in line with and intermediate of the mounting means pivot axis on said first arm means and said common arm pivot axis; means pivotably connecting the other end of said cushioning means to the other one of said arm means to define a pivot axis therefor, in angularly offset relationship with respect to, and intermediate of, the mounting means pivot axis on said other arm means and said common arm pivot axis; said first and second arm means being pivotable about said common arm pivot axis to define a first acute angle with said cushioning device in the fully-extended length configuration thereof, and to define a second smaller acute angle with said cushioning means, in the fully-compressed configuration thereof.

2. The shock-absorbing assembly of claim 1, wherein said substantially-in-line pivot axis for said first end of said cushioning means is displaced from said first arm means mounting means by a predetermined distance less than one-half the distance between the associated mounting means pivot axis and said common arm pivot axis; and with said angularly offset pivot axis for said second end of said cushioning device being displaced from said common arm pivot axis by substantially said predetermined distance.

3. The shock-absorbing assembly of claim 1, wherein said angular offset is an acute angle of less than 45° in excess of the angle defined between respective ones of said mounting means pivot axes and said common arm pivot axis.

4. The shock-absorbing assembly of claim 3, wherein each of said first and second arm means comprises a pair of arm members mounted in fixed parallel-spaced relationship; first end extremes of each pair of arm members being pivotably mounted about a first common arm pivot shaft; a second shaft mounted between respective ones of said first pair of arm members, with the longitudinal axis thereof defining said first end pivot axis of said cushioning device; a third shaft mounted between respective ones of said second pair of arm members, with the longitudinal axis thereof defining said other end pivot axis of said cushioning device; said first, second, and third shafts being mutually parallel with the pivot axes of said first and second mounting means; and said first and second ends of said cushioning means being pivotably mounted on said second and third shafts.

5. The shock-absorbing assembly of claim 4, wherein each of said first, second, and third pivot shafts are carried concentrically within cylindrical mounting members extending between parallel-opposed ones of said arm members, and communicate with bearing means in said arm members; and with the end extremes of said first, second, and third pivot shafts being closed by sealed cover members to thereby provide an atmospheric seal.

6. The shock-absorbing assembly of claim 5, with the axis of said second pivot shaft being displaced from said first mounting means pivot axis by a distance substantially less than the displacement between that pivot axis and said common arm pivot axis.

7. The shock-absorbing assembly of claim 6, wherein the spaced displacement between said common arm pivot axis and respective ones of said mounting means pivot axis, and the displacement between said common arm pivot shaft and respective ones of said second and third shafts are proportioned to define ratios of stroke between first and second mounting means to hydraulic cushioning means stroke from 3:1 to 6:1.

8. The shock-absorbing assembly of claim 7, with bonded sealing means at all recited points of relative motion between recited elements.

9. The shock-absorbing assembly of claim 8, further comprising means interconnected with respective ones of said first and second arm means, to limit the maximum angular relationship therebetween to less than that angular relationship effecting the fully-extended length configuration of said hydraulic cushioning device.

10. The shock-absorbing assembly of claim 9, wherein said hydraulic cushioning device comprises a piston-and-cylinder shock absorber member, with the piston and cylinder comprising the respective pivotably mounted ends thereof.

11. The shock-absorbing assembly of claim 10, wherein said shock absorber member comprises spring imparted restoring force means to urge the member to the fully-extended length configuration thereof in the absence of compressive force being relatively imparted between said first and second mounting means.

\* \* \* \* \*